United States Patent [19]
Arnold

[11] Patent Number: 5,768,788
[45] Date of Patent: Jun. 23, 1998

[54] HACKSAW WITH IMPROVED BLADE TENSION MECHANISM

[75] Inventor: Robert L. Arnold, Jacobus, Pa.

[73] Assignee: Hand Tool Design Corporation, Wilmington, Del.

[21] Appl. No.: 695,698

[22] Filed: Aug. 12, 1996

[51] Int. Cl.[6] .................................................. B27B 21/02
[52] U.S. Cl. ............................................. 30/513; 30/506
[58] Field of Search ............................ 30/506, 507, 513

[56] References Cited

U.S. PATENT DOCUMENTS

| | | | |
|---|---|---|---|
| 2,516,079 | 7/1950 | Shortell | 30/513 |
| 2,606,585 | 8/1952 | Collura | 30/506 |
| 3,636,997 | 1/1972 | Keymer | 30/513 |
| 3,822,731 | 7/1974 | Keymer | 30/513 |
| 4,256,156 | 3/1981 | Biszantz et al. | 30/506 |
| 4,349,059 | 9/1982 | Hepworth et al. | 30/513 |
| 4,367,779 | 1/1983 | Ewig | 30/506 |
| 4,571,829 | 2/1986 | Withers, Jr. | 30/144 |
| 5,388,333 | 2/1995 | Chen | 30/508 |
| 5,471,752 | 12/1995 | Koetsch | 30/513 |

FOREIGN PATENT DOCUMENTS

975610  11/1964  United Kingdom ................. 30/513

*Primary Examiner*—Hwei-Siu Payer
*Attorney, Agent, or Firm*—Leonard Bloom

[57] ABSTRACT

A hacksaw includes a blade tensioning mechanism attached to the lower portion of the handle and connected to the blade through a blade holder. The end of the blade holder is observed via a tension indicator window at the lower portion of the handle, and the handle has respective predetermined indicia adjacent to the tension indicator window for alignment with the end of the blade holder. The blade tension mechanism includes an adjusting screw threadingly engaging the blade holder, and a crank handle mechanically engaging the adjusting screw for adjusting the tension of the blade. At the desired blade tensioning, the crank handle is mechanically disconnected from the adjusting screw and fits closely in the recess underneath the lower portion of the handle.

32 Claims, 12 Drawing Sheets

HACKSAW WITH IMPROVED BLADE TENSION MECHANISM

FIELD OF THE INVENTION

The present invention relates to a hacksaw, and more particularly, to a hacksaw having a blade tensioning mechanism which provides a proper adjustment of blade tension and which can be conveniently stored within the handle of the hacksaw.

BACKGROUND OF THE INVENTION

Hacksaws with a properly tensioned blade show superior performance characteristics. They cut faster, are easier for the operator to use, and the cuts are smoother and cleaner.

Hacksaws provided with blade tensioning mechanisms are well known in the prior art.

For example, in lower cost hacksaws, the blade may be tensioned by merely turning a wing nut which engages a screw formed on the blade holder. This is inconvenient, manually, and does not provide an accurate indicator of the proper blade tension.

Additionally, U.S. Pat. No. 3,636,997 discloses a hacksaw having a frame arm which telescopes into and out of a socket in the handle. A lever assembly mounted on the handle cocks and binds the frame arm in the socket and simultaneously tensions the blade when a lever is moved from an open to a locked position.

Disadvantageously, the lever does not give a high tension on the blade, but rather permits the blade to be either tensioned or untensioned, and no tension adjustment is allowed.

U.S. Pat. No. 3,822,731 discloses a hacksaw having an external crank for rotating a take-up pin which is threaded to the blade connector block, so that cranking of the external crank draws the blade connector block rearwardly and thus tightening the hacksaw blade.

The crank is folded against the rear surface at the handle after the blade tensioning function has been performed. Disadvantageously, the palm of a user engages the folded crank during work that may cause inconvenience to the user and, even more seriously, injury to the user's hand.

Besides, it might happen that when a required tension is achieved and the crank is to be folded, the recess in the crank is not aligned circumferentially with the handle. Therefore, in order to align the crank with the handle, the tension on the blade must be slightly released or else over-tensioned; that is undesirable.

Disadvantageously, none of the above patents discloses any means for indicating the tension applied to the blade. That is important if different types of blades are used, or if blades from different manufacturers are used, since each blade needs a proper distinct tension to be applied thereto.

U.S. Pat. No. 4,256,156 discloses a multi-tension hacksaw having a tension indicator. The hacksaw includes a longitudinally extending frame member having a tensioning rod substantially parallel to the blade. An elongated crank handle threadedly and rotatably engages the threaded end of the tensioning rod. Rotation of the crank handle applies tension to the tension rod, and thereby to the blade. The tension indicator includes a pointer mounted on a bracket on the end of the tensioning rod opposite to the crank handle. Two lines are provided on the blade support member opposite to the crank handle. When the pointer points to one of these lines, then a proper tension has been imparted to a certain type of blade.

Disadvantageously, the crank handle engages a user's hand during the work. This is inconvenient. Besides, the tension indicator (disclosed) is somewhat complicated.

Accordingly, a simple, convenient and accurate blade tensioning mechanism for a hacksaw would be a very desirable contribution to the art.

BRIEF SUMMARY OF THE INVENTION

It is, therefore, an object of the present invention to provide a hacksaw with a blade tensioning mechanism which is accurate and easy and convenient to use.

It is another object of the present invention to provide a blade tensioning mechanism including a crank handle which is conveniently hidden or stored within the handle of the hacksaw, so as not to engage the user's hand during operation of the hacksaw.

It is still an object of the present invention to provide a blade tensioning mechanism equipped with a means allowing the crank handle to be readily aligned, circumferentially, with its recess within the handle, thereby avoiding over (or under) tensioning of the blade.

The present invention finds particular utility as a blade tensioning mechanism for a hacksaw having a frame arm and a handle.

According to the teachings of the present invention, the hacksaw includes a blade tensioning means removably stored within the lower portion of the handle and attached to one end of the blade, and further includes a tension indicator window at the lower portion of the handle.

The blade tensioning means preferably includes a blade holder secured to one end of the blade, an adjusting screw carried by the blade holder and a crank handle for rotating the adjusting screw, thereby changing the degree of engagement between the blade holder and the screw, and thereby adjusting the blade tension.

When the crank handle (in its open position) is rotated in one direction, it causes the drawing of the blade holder into the socket within the lower portion of the handle resulting in increased blade tension. Conversely, rotation of the crank handle in the opposite direction reduces the blade tension. When the blade holder is drawn into its socket such that all free movement is eliminated, the rearward end of the blade holder is observed through the tension indicator window and is aligned with a respective tension indicia or graduation adjacent to the window and, thereafter, the crank handle is further rotated so that the rearward end of the blade holder moves a predetermined number of graduations for a particular blade.

When the blade adjustment has been accomplished, the crank handle is mechanically disconnected from the adjusting screw and, in its closed position, it closely fits within a recess formed in the lower portion of the handle. The crank is retained therein by a detent means, such that the user's hand does not engage the crank handle during use of the hacksaw.

Preferably, a sleeve is removably secured to the adjusting screw and is capable of a reciprocal movement therealong between a proximate position and a distal position thereof. The crank handle is pivotally secured to the rearward end of the sleeve. An internal socket is provided on the forward end of the sleeve, and a cooperative head is provided at the end of the adjusting screw. Then, for adjusting the blade tension, the internal socket on the sleeve grips the cooperating head on the adjusting screw, thereby providing a mechanical connection between the crank handle and the adjusting screw.

For disconnecting the crank handle from the adjusting screw, the sleeve is moved from its distal position towards its proximate position, such that the cooperating head disengages from the internal socket, thereby allowing the crank handle to have a "free wheeling" rotation without affecting the adjusting screw.

Preferably, the socket (which extends through the lower portion of the handle) includes a front portion and a rear portion. The front portion has a substantially square cross-section to allow an axial movement of the blade holder therein, while the rear portion has a substantially cylindrical shape to allow reciprocal and rotational movement of the adjusting screw therein. The cross-sectional dimensions of the rear portion of the socket in the handle are larger than outside cross-sectional dimensions of the sleeve, such as to allow reciprocal movement of the sleeve within the rear portion.

Preferably, a blade supporting member extends from the frame arm opposite to the handle and cooperates with the blade holder to support the blade along the longitudinal plane of the hacksaw. Alternatively, the blade can be supported at an angle of 45° to the longitudinal plane.

Preferably, the rearward end of the blade holder has a substantially square cross-section and includes a longitudinal orifice therein for engagement with the forward end of the adjusting screw.

Preferably a plastic sheath (having a U-shaped cross-section) is removably secured to the handle for user convenience.

Viewed in another aspect, the present invention provides a method of tensioning a hack-saw blade including the steps of providing a hacksaw including a portion (such as a handle) having a window (comprising a tension indicator window) formed therein and further having graduations (or indicia) adjacent to the window. The tensioning means for the blade includes a member (such as the blade holder) having a portion visible through the window. Initially, the tensioning means is moved so that the slack in the blade is taken up, and such that the portion of the member is aligned with one of the graduations. Secondly, the tensioning means is further moved so that the portion of the member is moved by a predetermined number of graduations, thereby assuring proper blade tensioning.

These and other objects of the present invention will become apparent from a reading of the following specification taken in conjunction with the enclosed drawings.

DESCRIPTION OF THE INVENTION

Referring to FIGS. 1–18B, a hacksaw 10 includes a frame 11 secured to an upper portion 12 of a handle 13. The frame 11 has an end 14 secured to the handle 13. A blade support member 15 is secured to an end 16 of the frame 11 opposite to the handle 13. A blade 17 is maintained between the blade support member 15 and the handle 13 in the longitudinal plane of the hacksaw 10 or in an alternative plane at a 45° angle to the longitudinal plane, as may be required for certain bevel cuts.

Figure 1:
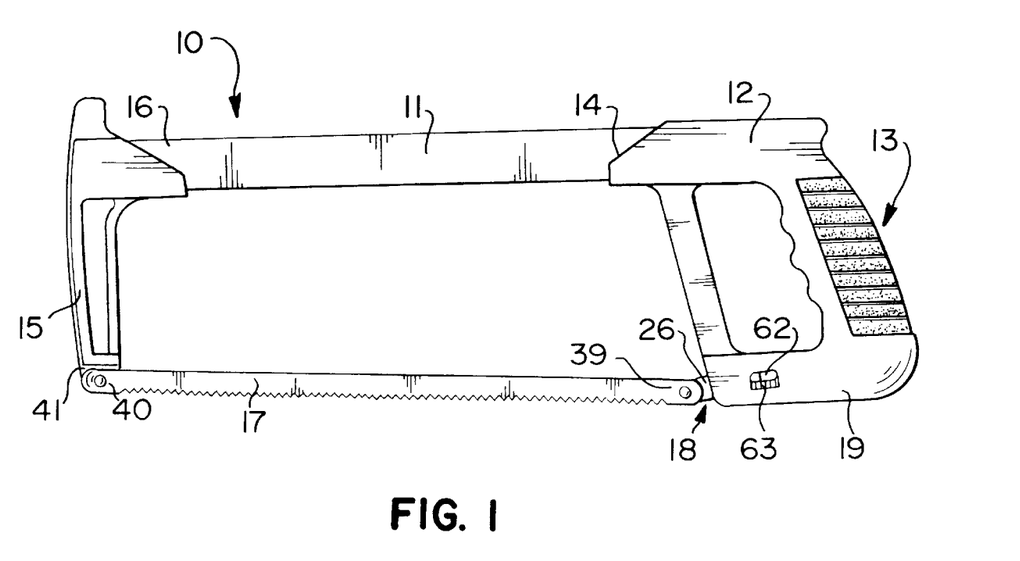
FIG. 1 is a side elevational view of a hacksaw which, with the teachings of the present invention, may find particular utility.
Figure 2:
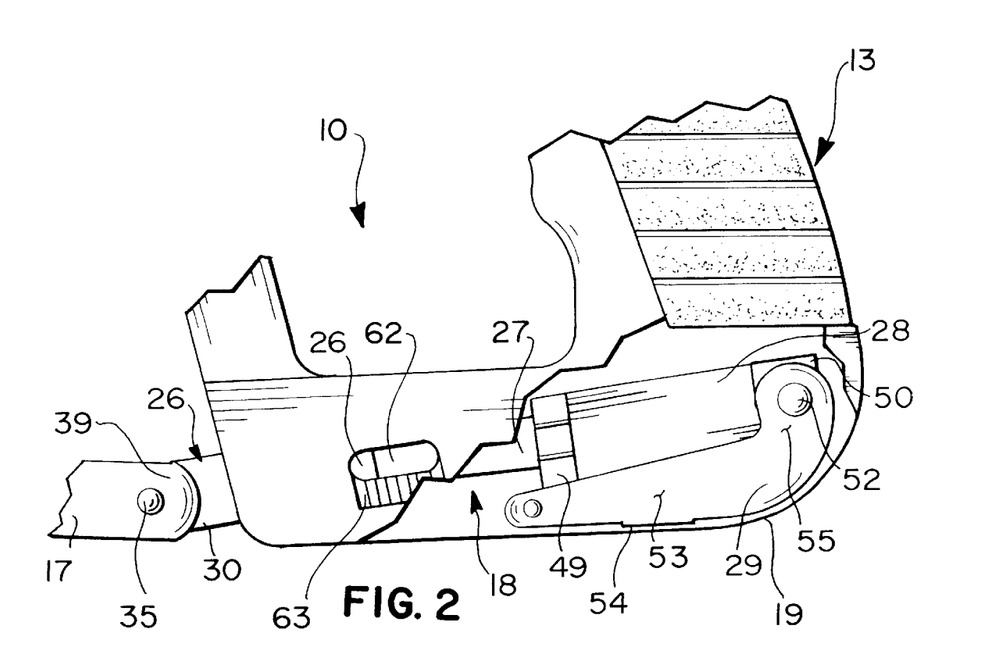
FIG. 2 is an enlarged view of the lower portion of the hacksaw handle, a portion of which is cut away to show the tensioning mechanism of the present invention.

The mechanical connections between the end 14 of the frame 11 and the handle 13, and between the end 16 of the frame 11 and the blade support member 15, respectively, can be permanent or can be disassembled (as known to those skilled in the art) and is not intended to be discussed herein.

Different types of blades 17 (or blades from different manufacturers) can be used with the hacksaw 10 of the present invention. This may include, but not be restricted to, carbon blades (which require a lesser tension) or bimetal blades, for example, which require a higher tension. Therefore, each blade type requires a proper degree of tension.

Accordingly, the hacksaw 10 of the present invention is equipped with a blade tensioning means (mechanism) 18, which can adjust the blade tension according to the requirements of each type of the blade 17.

Figure 4:
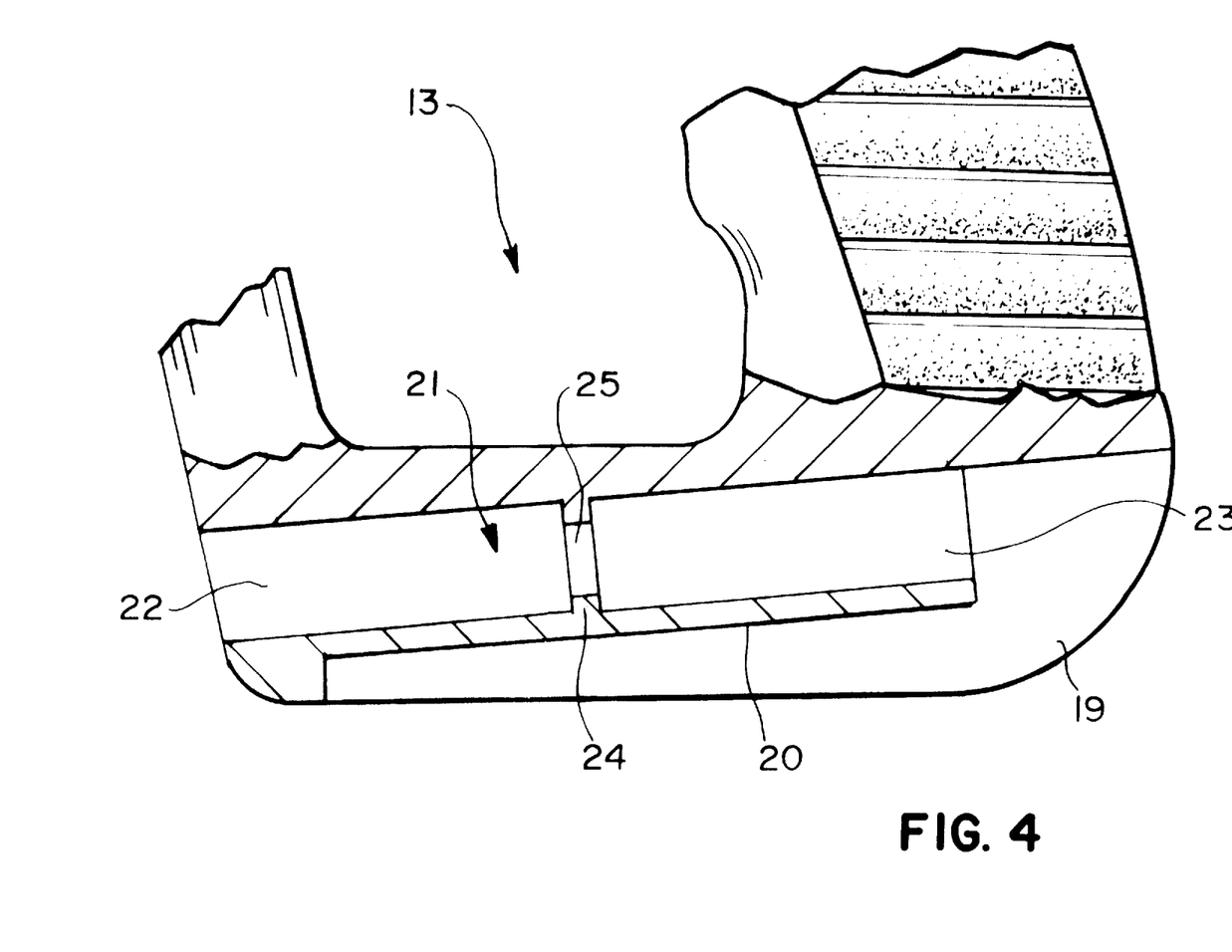
FIG. 4 is longitudinal section of the lower portion of the handle showing, on an enlarged a scale, a socket extending therethrough.
Figures 5, 6, 7, 8:
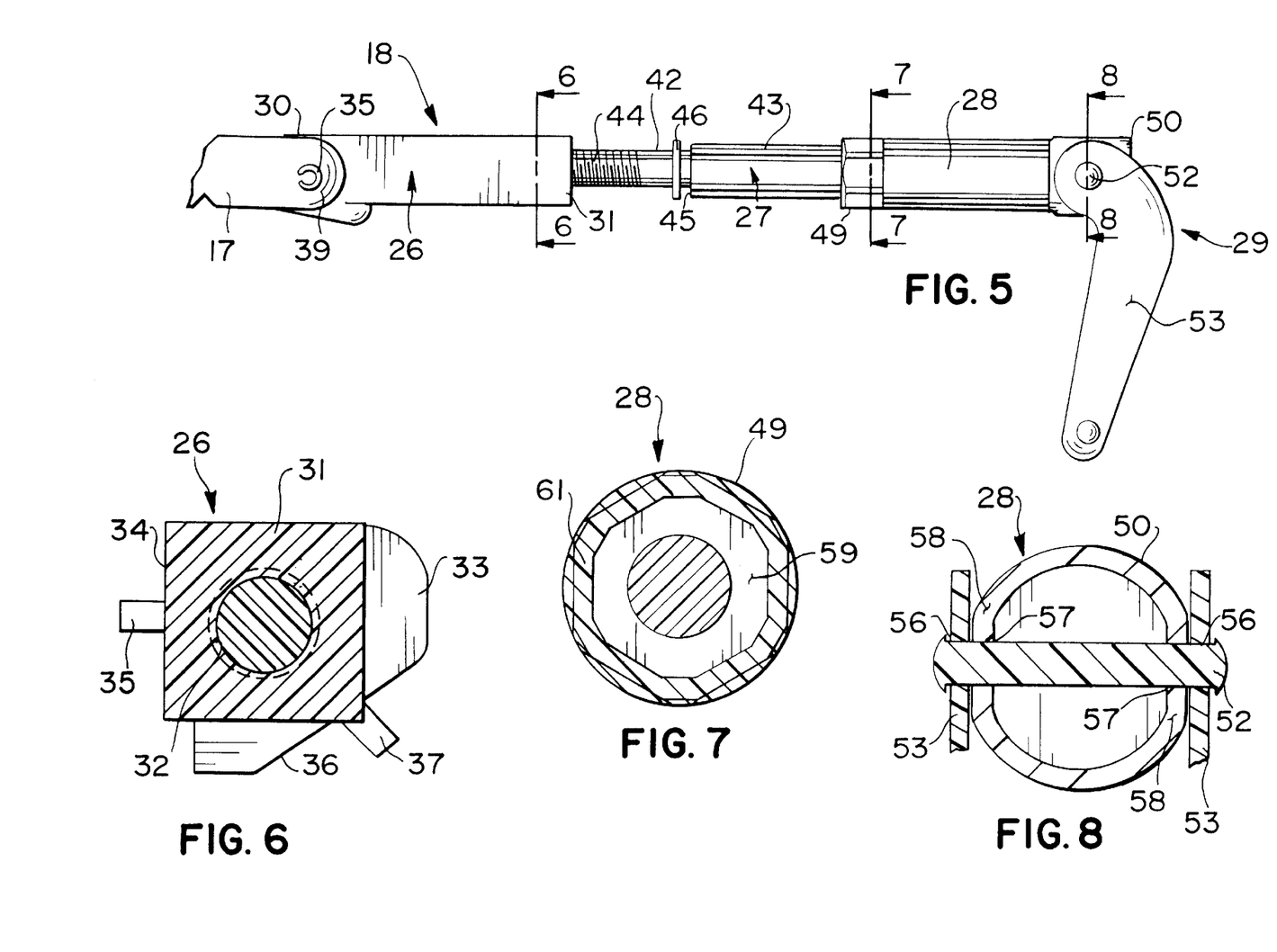
FIG. 5 shows the assembled tensioning mechanism of the present invention.
FIGS. 6, 7 and 8 are cross-sections taken along lines 6—6, 7—7 and 8—8 of FIG. 5, respectively.

The blade tensioning mechanism 18 is removably attached to a lower portion 19 of the handle 13. For this purpose, the lower portion 19 is provided with a barrel 20 (best shown in FIGS. 12 and 13) which constitutes a socket 21 extending through the lower portion 19 of the handle 13. As best shown in FIG. 4, the socket 21 has a front portion 22 and a rear portion 23 separated by a cross wall 24 having a central hole 25 therein. The front portion 22 has a substantially squared cross-section, while the rear portion 23 constitutes a cylinder.

As best shown in FIGS. 2, 3 and 9–18B, the blade tensioning mechanism 18 includes a blade holder 26, an adjusting screw 27, a sleeve 28, and a crank handle 29.

Figure 3:
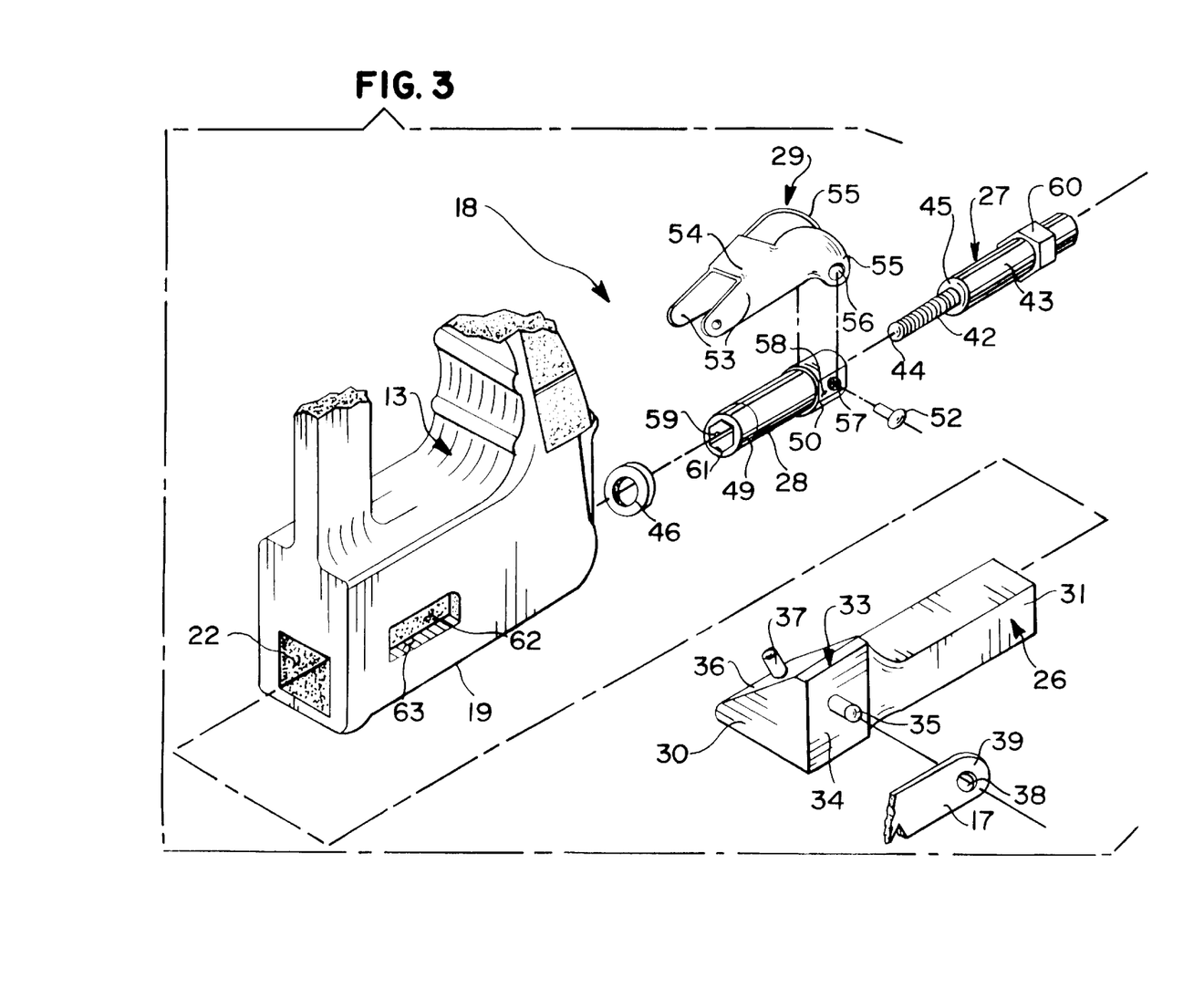
FIG. 3 is an exploded perspective view of the blade tensioning mechanism of the present invention.

The blade holder 26 has a forward end 30 to which the blade 17 is removably attached, and further has a rearward end 31 which is substantially squared in cross-section and has a threaded orifice 32 extending a certain length therein.

In making a bevel cut, it is desired that the blade 17 be disposed at an angle of 45° with respect to the longitudinal plane defined by frame 11 of the hacksaw 10. For this purpose, the forward end 30 of the blade holder 26 includes a support structure 33 for holding the blade 17 in either one of two planes of a desired cut. The support structure 33 includes a surface 34 (corresponding to the longitudinal plane) equipped with a holding pin 35 and a surface 36 (at 45° angle to the surface 34) equipped with the holding pin 37.

The blade 17 has a hole 38 for engagement with either one of the pins, 35 or 37, such that the end 39 of the blade 17 is connected to the blade holder, as is known to those skilled in the art, in either one of the planes. Another end 40 of the blade 17 engages the blade support member 15. The blade support member 15 provides (at its lower end 41) a means (not shown) which, similarly to and in combination with the support structure 33 of the blade holder 26, supports the blade 17 in the longitudinal plane or in the 45° plane.

The squared rearward end 31 of the blade holder 26 is sized precisely to fit into the front portion 22 of the socket 21 at the lower portion 19 of the handle 13.

The adjusting screw 27 has a forward portion 42 and a rearward portion 43. The forward portion 42 is threaded a certain length and constitutes a forward end 44 of the adjusting screw 27 for threadably engaging the internal threads of the orifice 32 in the blade holder 26. The rearward portion 43 is a cylinder having a diameter larger than the diameter of the forward portion 42, such that an annular ledge 45 is formed between the forward portion 42 and the rearward portion 43 of the adjusting screw 27.

When the rearward end 31 of the blade holder 26 is placed into the front portion 22 of the socket 21 and the adjusting screw 27 is accommodated within the rear portion 23 of the socket 21, such that the forward end 44 of the adjusting screw 27 engages the orifice 32, the forward portion 42 of the adjusting screw 27 passes through the central hole 25 in the cross wall 24 in the socket 21. The ledge 45, however, prevents the rearward portion 43 from passing through the central hole 25, since the ledge 45 engages the cross wall 24 while the degree of the threaded engagement between the forward end 44 of the adjusting screw 27 and the blade holder 26 increases, thereby "pulling" the blade holder 26 into the socket 21. Since the end 40 of the blade 17 is held by, and is secured to, the blade support member 15, the movement of the blade holder 26 (in the direction into the socket 21) increases the tension applied to the blade 17.

A washer 46 is positioned between the cross wall 24 of the socket 21 and the ledge 45 in order to provide an improved "anchor" for the adjusting screw 27.

Figure 9:
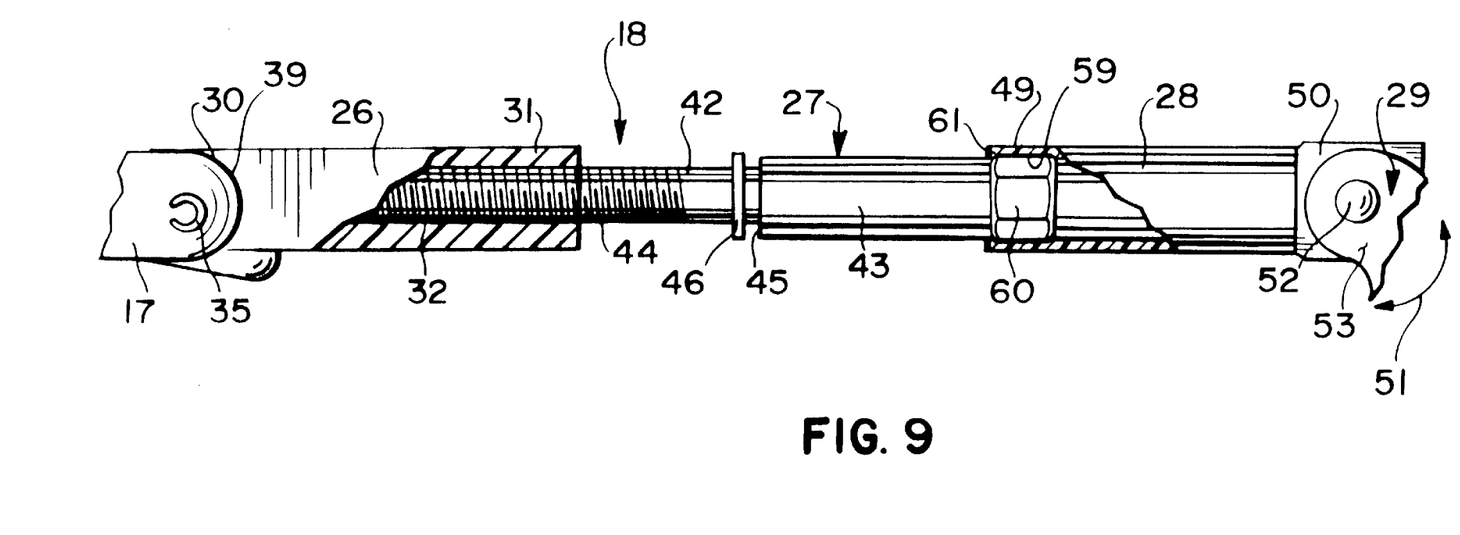
FIG. 9 shows the assembled tensioning mechanism of FIG. 5 partially sectioned longitudinally.
Figure 10:
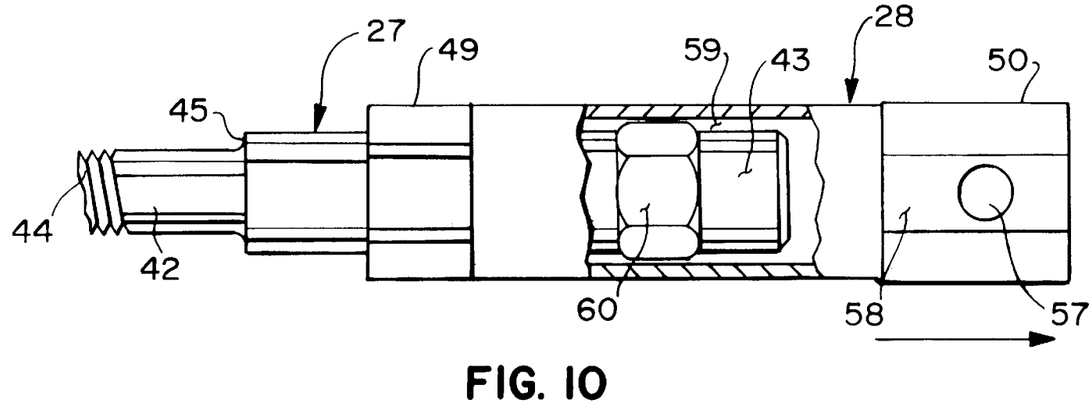
FIGS. 10 and 11 show, somewhat on an enlarged scale, the sleeve of the tensioning mechanism in two positions with respect to the adjusting screw.
Figure 11:
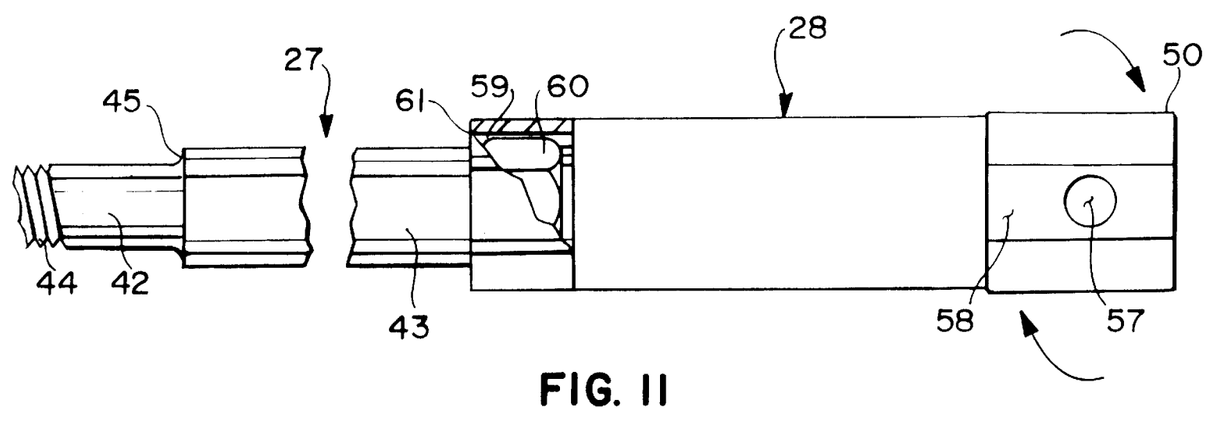
Figure 12:
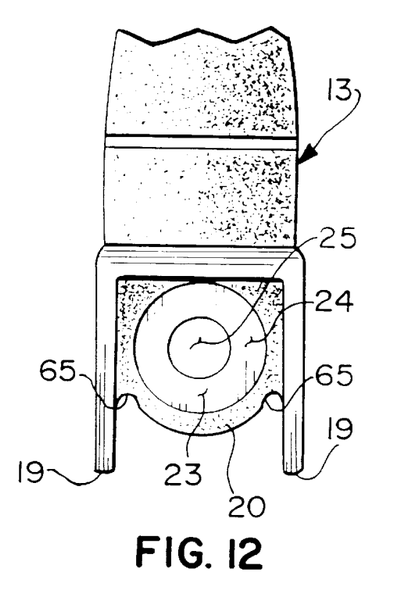
FIG. 12 is a rear end view of the lower portion of the handle (the tensioning mechanism being removed from the socket).
Figure 13:
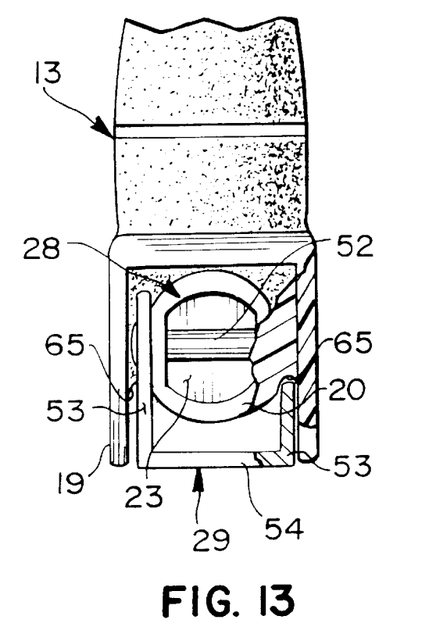
FIG. 13 is a rear end view, substantially as shown in FIG. 12, but with the tensioning mechanism placed within the socket.
Figure 14:
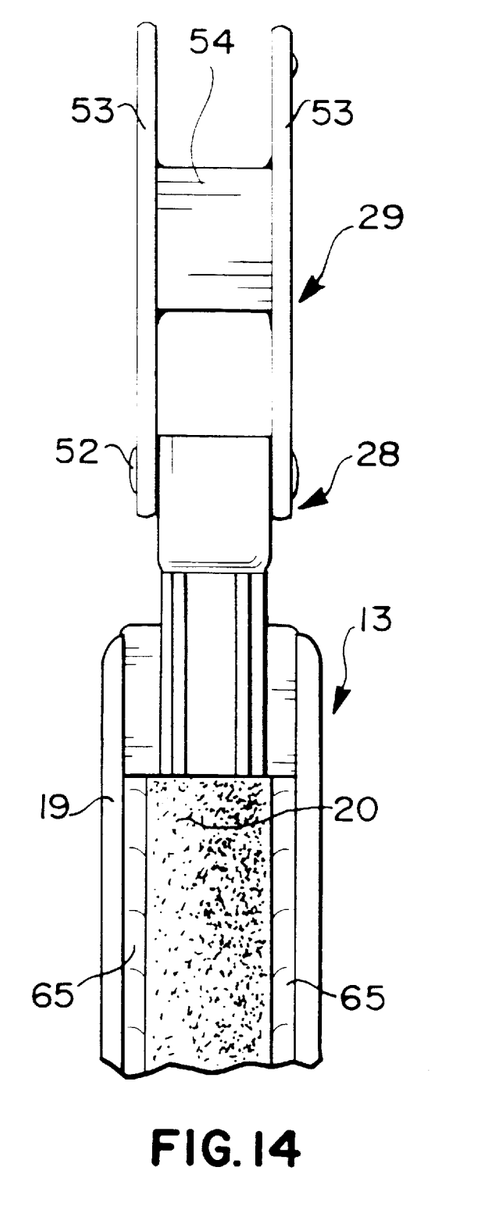
FIG. 14 is a bottom view of the lower portion of the handle showing the crank handle in its open position.

The squared front portion 22 of the socket 21 allows an axial movement of the rearward end 31 of the blade holder 26 within the socket 21, while the cylindrical rear portion 23 of the socket 21 allows a reciprocal and rotational movement of the adjusting screw 27 therein. In order to rotate the adjusting screw 27, the tensioning mechanism 18 is further provided with the crank handle 29, which is removably secured to the rearward portion 43 of the adjusting screw 27 by means of a sleeve 28. The sleeve 28 is removably secured to the rearward portion 43 of the adjusting screw 27 and is capable of a reciprocal movement between a proximate position (as best shown in FIGS. 9 and 11) and a distal position along the adjusting screw 27. The sleeve 28 has a forward end 49 and a rearward end 50.

The crank handle 29 is pivotally secured to the rearward end 50 of the sleeve 28; and as best shown by an arrow 51 in FIG. 9, can perform rotational movement in two directions around a pin 52, such that the crank handle 29 can take a folded (or closed) position, an open position, and any other angular position convenient and required for manipulating the crank handle 29. The crank handle 29 has a pair of substantially parallel spaced walls 53 integrally connected by a beam 54. Each wall 53 has a pivot portion 55 provided with a hole 56, which are aligned therebetween. The pin 52 protrudes through the holes 56 onto walls 53 and through respective holes 57 provided on the opposite sides 58 of the rearward end 50 of the sleeve 28, when the pivot portions 55 embrace the opposite sides 58 and the holes 56 and 57 are aligned therebetween, and secures the crank handle 29 to the sleeve 28.

In the proximate position of the sleeve 28, when the rearward end 43 of the adjusting screw 27 engages the pin 52, the sleeve 28 is prevented from further axial movement towards the forward end 44 of the adjusting screw 24.

In the distal position, best shown in FIGS. 9 and 11, an internal socket 59 on the forward end 49 of the sleeve 28 engages a cooperating head 60 provided on the rearward portion 43 of the adjusting screw 27. A crimp 61, best shown in FIG. 9, is provided at the forward end of the internal socket 59, such that the crimp 61 engages the cooperating head 60, and prevents the sleeve 28 from being removed from the adjusting screw 27. Preferably, the internal socket 59 and the cooperating head 60 have a hexagonal form and are sized such that the internal socket 59 may grip the cooperating head 60 on the adjusting screw 27.

As best shown in FIGS. 5, 9, 11, 18A, 18B and 19, in order to adjust the blade tension, the crank handle 29 is opened; the sleeve 28 is "pulled" to its distal position, such that the internal socket 59 or the sleeve 28 "grips" the cooperating head 60 on the adjusting screw 27; and the crank handle 29 is rotated in a certain direction (for instance, clockwise) thereby causing the threading of the forward end 44 of the adjusting screw 27 into the orifice 32 of the blade holder 26, thereby driving the blade holder 26 into the front portion 22 of the socket 21, and thereby increasing the blade tension.

Conversely, when the crank handle 29, in its open position, is rotated in the opposite direction (for example, counter-clockwise) the tension of the blade 17 is reduced.

The rearward end of the blade holder 26 is observed through a tension indicator window 62 for being aligned with one of the tension indicia 63 predetermined for the type of the blade 17 being tensioned.

When the blade tension adjustment has been accomplished, the crank handle 29 is disconnected from the adjusting screw 27. It will be understood by those skilled in the art, that the blade 17 will be maintained under the proper tension (once the tension has been properly adjusted) since two forces affect the blade. One of the forces applies to the end 40 of the blade 17 by the blade support member 15 and "pulls" the blade 17 in the direction from the handle 13 to the blade support member 15. Another force is applied to the end 39 of the blade 17 and "pulls" the blade 17 in the opposite direction, i.e., towards the handle 13. The amplitude of the force at the end 39 corresponds to the degree of the engagement between the blade holder 26 and the adjusting screw 27 and can be maintained due to the "anchorage" provided to the adjusting screw 27 at the cross wall 24.

Once the required blade tension has been achieved, disconnection of the crank handle 29 from the adjusting screw 27 does not affect the tensioning mechanism 18 due to a balance between the forces applied to the blade 17.

Figure 15:
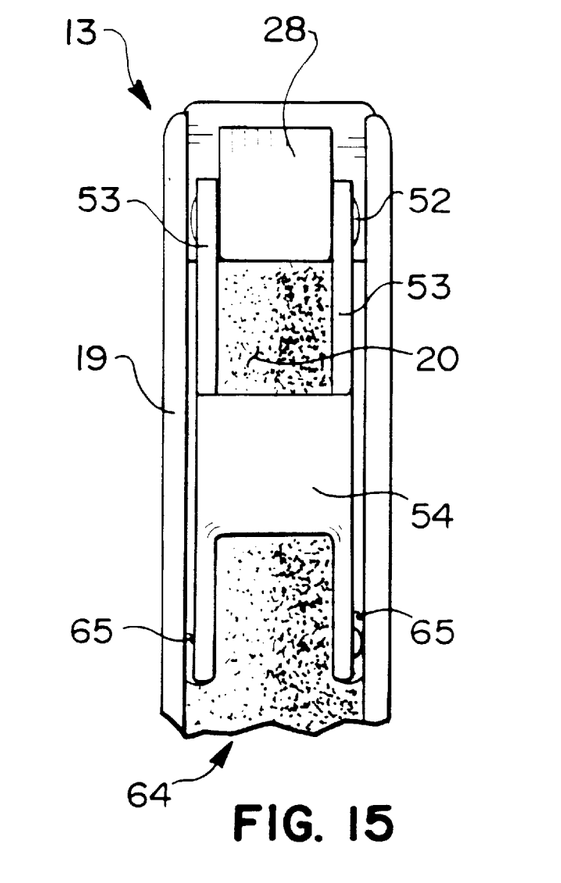
FIG. 15 is a bottom view of the handle, as shown in FIG. 14, but showing the crank handle in the closed position.
Figure 15A:
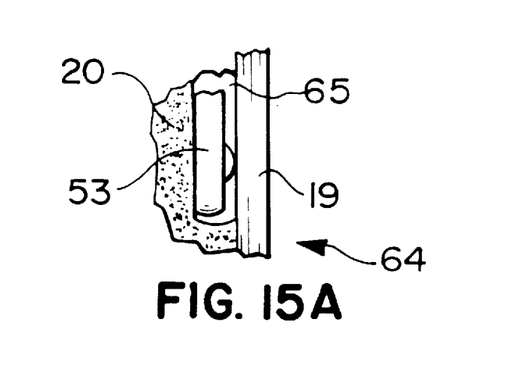
FIG. 15A shows on an enlarged scale a portion of the crank handle of FIG. 15 in the closed position, held by the detent means.

For disconnecting the crank handle 29, the sleeve 28 moves from its distal position towards its proximate position (as best shown on FIG. 10) thereby releasing the gripping action between the internal socket 59 and the cooperating head 60; and the crank handle 29 is mechanically disconnected from the adjusting screw 27, such that the crank handle 29 is allowed to have a "free-wheeling" (i.e., free rotation) without affecting the adjusting screw 27. Thereafter, the crank handle 29 can be folded (or closed) such that its parallel walls 53 can be readily aligned with the detent means 64 underneath the lower portion 19 of the handle 13, and can fit closely into a pair of substantially parallel slots 65 of the detent means (as best shown in FIGS. 15 and 15A) and is gripped therein. Being closed underneath and within the handle 13, the crank handle 29 avoids any contact with the user's hand, which provides convenience and safety for the user.

Of significance, the blade tension may be easily and conveniently set, and the crank handle 29 may be placed back into its stored position without affecting the desired blade tension. It is not necessary to turn the crank handle 29, circumferentially with the longitudinal plane of the hacksaw 10; nor is it necessary to over tension or under tension the blade to enable the crank handle 29 to return to its stored position.

It is readily understood by those skilled in the art, that the cross dimensions of the rear portion 23 of the socket 21 in the handle 13 are larger than the outside cross dimensions of the sleeve 28, such as to allow reciprocal movement of the sleeve 28 therewithin.

Figures 16, 17:
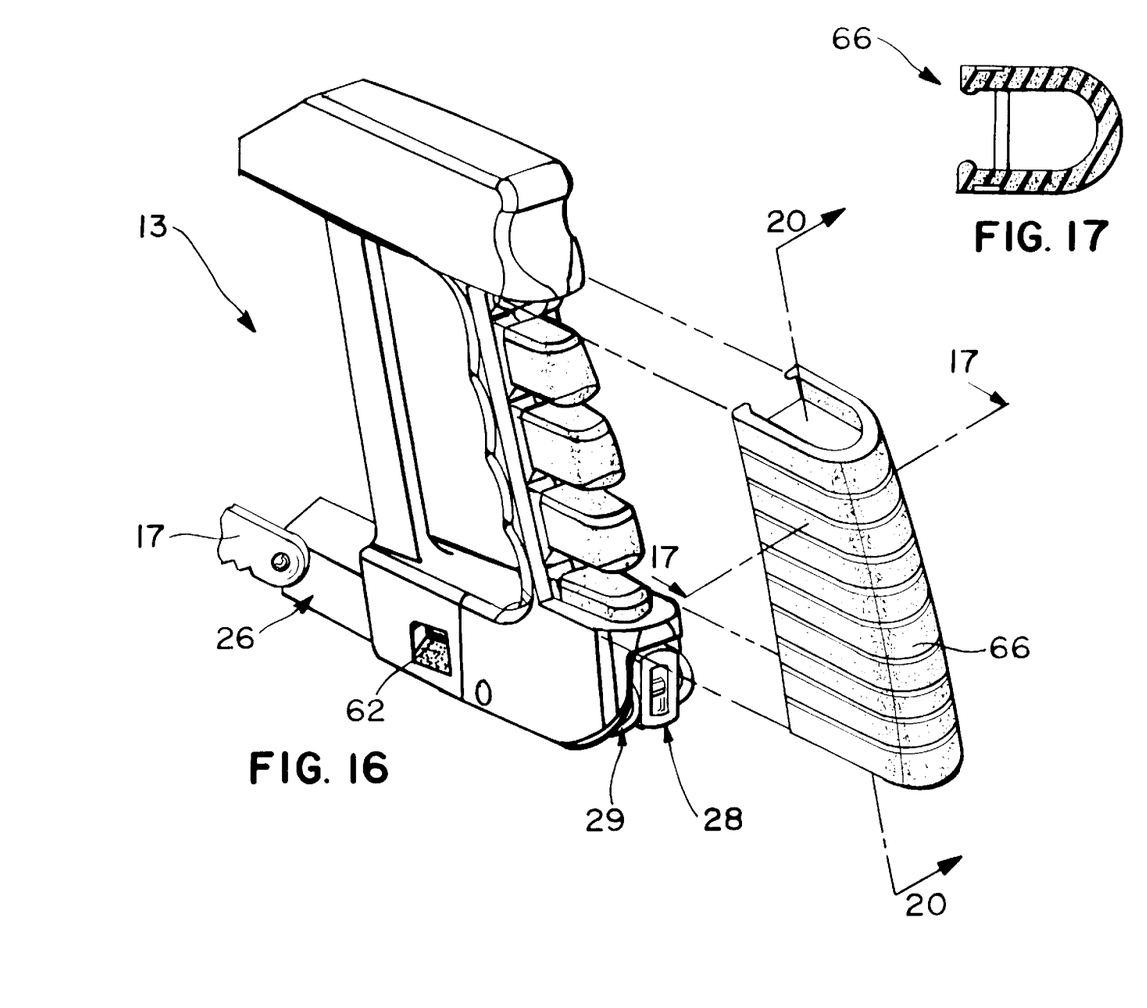
FIG. 16 is a perspective rear view of the handle of the hacksaw of the present invention with the crank handle in its closed position, and with an elastomer sheath secured thereto.
FIG. 17 is a cross sectional view of the sheath, taken along lines 17—17 of FIG. 16.
Figure 18A:
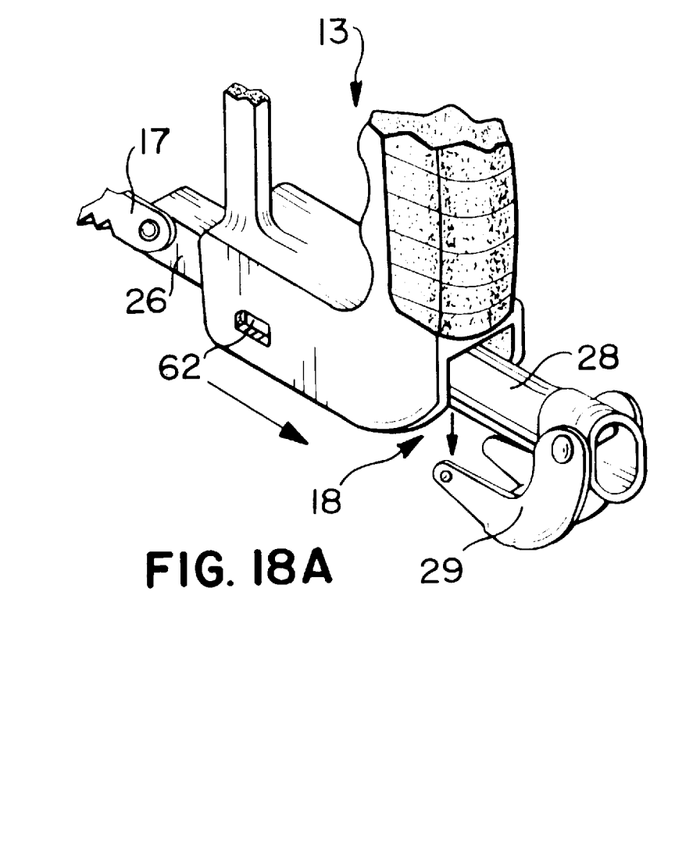
FIGS. 18A and 18B show the sequence of the steps of the blade tensioning according to the present invention.
Figure 18B:
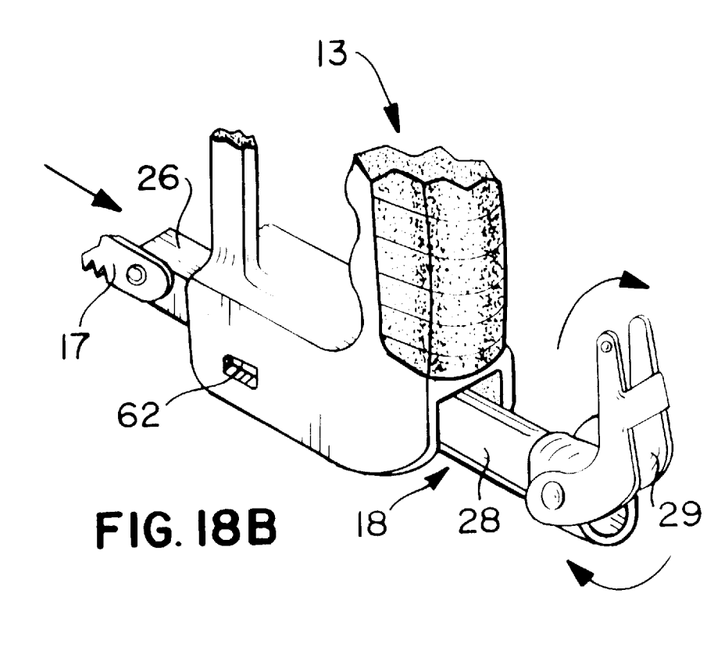
Figure 19:
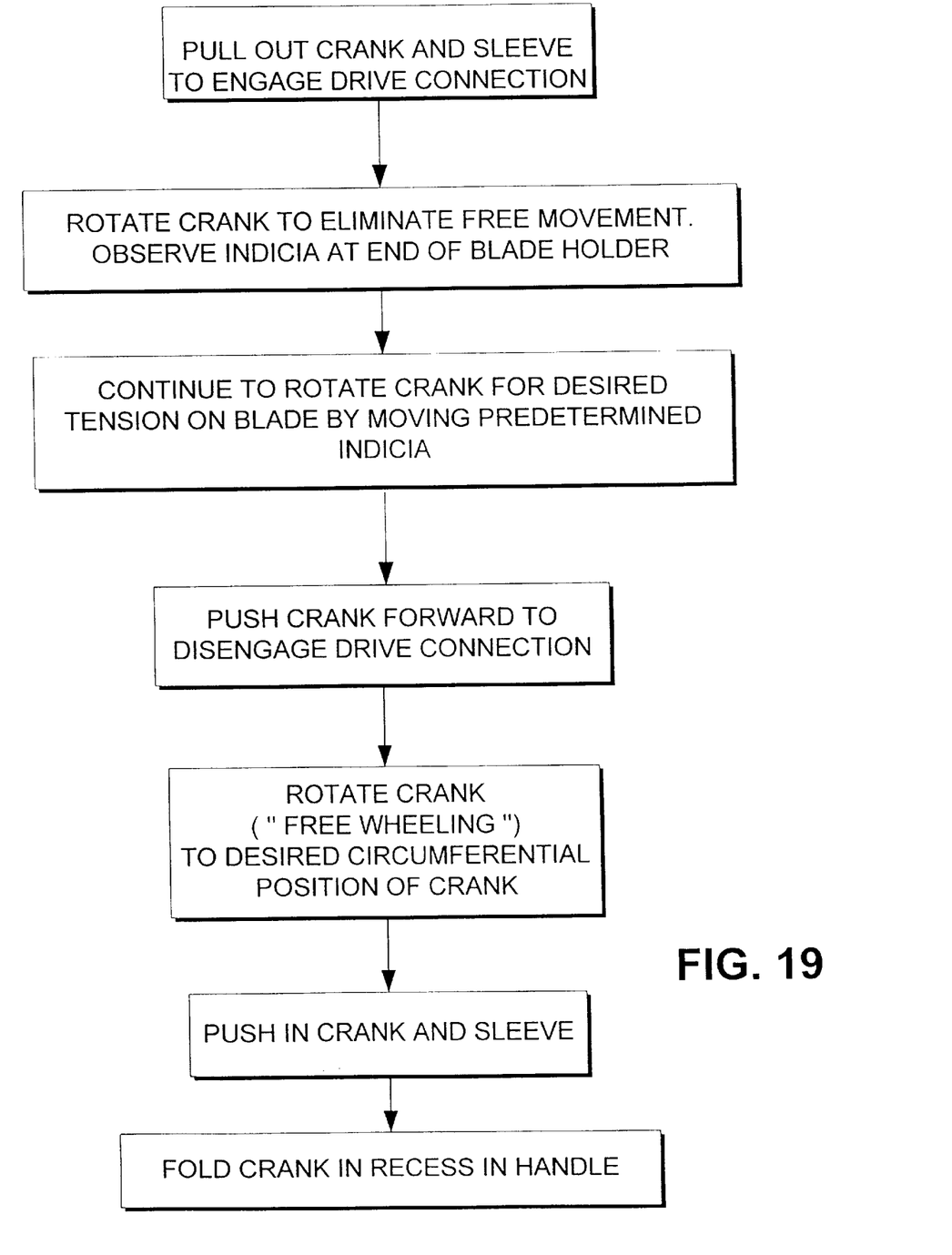
FIG. 19 is a flow-chart showing the sequence of operations of the blade tensioning mechanism of the present invention.
Figure 20:
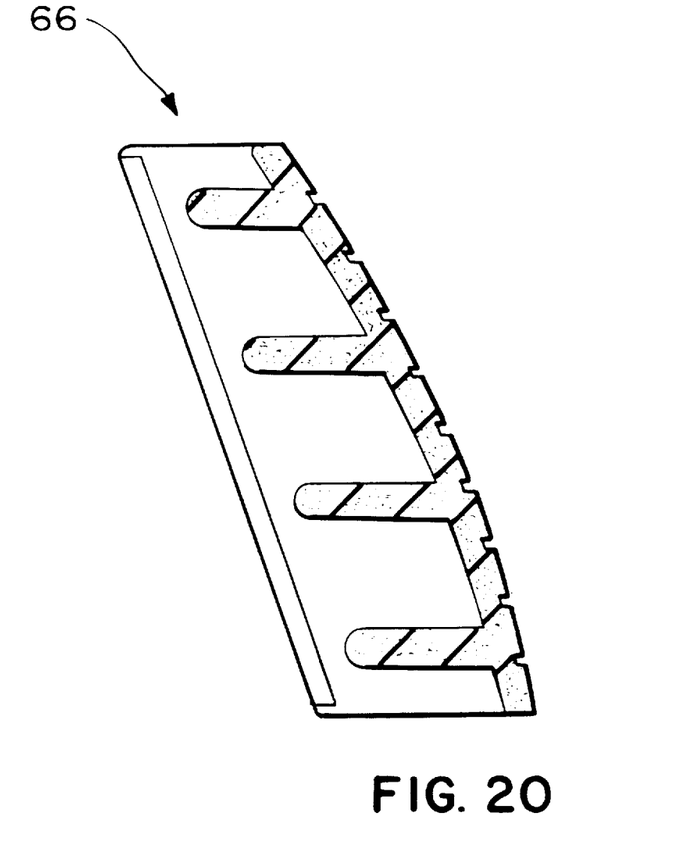
FIG. 20 is a longitudinal sectional view of the sheath, taken along lines 20—20 of FIG. 16.

For user convenience, a plastic sheath 66, best shown in FIGS. 16, 17 and 20, can be secured to the handle 13 in order to damp vibrations applied to the user's hand by the hacksaw.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A hacksaw having a blade, comprising:

a handle having a lower portion and an upper portion and further having a detent means within the lower portion thereof, a socket extending through the lower portion of the handle, a blade tensioning means removably attached to the lower portion of the handle and connected to the blade at one end hereof, a frame arm being secured at one end thereof to the upper portion of the handle, and having a blade supporting member extending therefrom at another end thereof opposite to the handle and supporting another end of the blade, and a tension indicator window at the lower portion of the handle having at least one tension indicia adjacent thereto;

wherein the blade tensioning means includes:

a blade holder connected by its forward end to the blade, an adjusting screw threadingly engaging a rearward end of the blade holder, and a crank handle having open and folded positions, and having means for disengaging the crank handle from the adjusting screw;

wherein, for adjusting the blade tension, the crank handle, in its open position, is rotated in one direction causing the threading of the forward end of the adjusting screw into the blade holder, thereby driving the blade holder into the socket, and thereby increasing the blade tension, while the rotation of the crank handle in the opposite to said one direction, causes reduction of the blade tension;

wherein said rearward end of the blade holder is observed through the tension indicator window for being aligned with said at least one tension indicia predetermined for a required type of blade; and wherein, when the blade tension adjustment has been accomplished, the crank handle, in its closed position, is held within the lower portion of the handle by the detent means and the crank handle is mechanically disconnected form the adjusting screw.

2. A hacksaw having a blade, the hacksaw comprising:

a frame, a handle having a lower portion and an upper portion and further having a detent means within the lower portion thereof, and a blade tensioning means removably attached to the lower portion of the handle and connected to the blade at one end thereof;

wherein the blade tensioning means includes:

a blade holder having a forward end connected to the blade, an adjusting screw threadably engaging a rearward end of the blade holder, and a crank handle having open and folded positions, respectively, and having means for disengaging the crank handle from the adjusting screw;

wherein, for adjusting the tension of the blade, the crank handle, in its open position, is rotated in one direction thereby causing an increase of the blade tension, while the rotation of the crank handle in a direction opposite to said one direction causes a reduction of the blade tension; and wherein, when the blade tension adjustment has been accomplished, the crank handle is mechanically disconnected from the adjusting screw, and, in its closed position, is held within the lower portion of the handle by the detent means.

3. The hacksaw of claim 2, further including a tension indicator window provided at the lower end of the handle and at least one tension indicia on the handle and adjacent to the tension indicator window.

4. The hacksaw of claim 3, wherein said rearward end of the blade holder is observed through the tension indicator window for being aligned with said at least one tension indicia predetermined for a required type of the blade.

5. The hacksaw of claim 2, wherein a socket extends through the lower portion of the handle, wherein a frame arm has one end thereof secured to the upper portion of the handle, wherein a blade supporting member extends from the frame arm at another end thereof opposite to the handle, the blade having another end supported by the blade supporting member, and wherein the rotation of the crank handle in said one direction causes the threading of the forward end of the adjusting screw into the blade holder, thereby driving the blade holder into the socket, and thereby increasing the blade tension.

6. The hacksaw of claim 5, further including a sleeve removably secured to the adjusting screw and capable of a reciprocal movement thereby between a proximate position and a distal position thereof, the sleeve having forward and rearward ends; the crank handle being pivotally secured to the rearward end of the sleeve; an internal socket provided on the forward end of the sleeve and a cooperating head being provided on the rearward end of the adjusting screw; wherein, for adjusting blade tension, the internal socket on the sleeve grips the cooperating head on the adjusting screw, thereby providing a mechanical connection between the crank handle and the adjusting screw.

7. The hacksaw of claim 6, wherein for disconnecting the crank handle from the adjusting screw, the sleeve is moved from its distal position towards its proximate position, and the cooperating head disengages the internal socket, thereby allowing the crank handle a free rotation without affecting the adjusting screw.

8. The hacksaw of claim 6, wherein the detent means within the lower portion of the handle includes a pair of substantially parallel spaced slots, wherein the crank handle has a pair of substantially parallel spaced walls, and wherein each of said pair of the parallel walls fits in a respective one of said pair of slots for being gripped therein.

9. The hacksaw of claim 8, wherein said walls of the crank handle are integrally connected by a beam, wherein each said wall includes a pivot portion having a hole, the holes on each of said pair of the walls being aligned to each other, wherein the rearward end of the sleeve has a pair of symmetrical holes on opposite sides thereof, and wherein a pin is provided, such that, when the pivot portions of the parallel walls of the crank handle embrace the opposite sides of the rearward end of the sleeve and the respective holes are being aligned, said pin pivotally secures the crank handle to the sleeve.

10. The hacksaw of claim 9, wherein, when the rearward end of the adjusting screw engages the pin securing the crank handle to the sleeve, the proximate position of the sleeve is identified, and the sleeve is prevented from further axial movement towards the forward end of the adjusting screw.

11. The hacksaw of claim 9, wherein a crimp is provided at the forward end of the sleeve, and wherein, when said crimp engages the cooperating head on the rearward end of the adjusting screw, the distal position of the sleeve is identified, and the sleeve is prevented from being removed from the adjusting screw.

12. The hacksaw of claim 8, wherein said parallel walls of the crank handle are formed to fit exactly underneath the lower portion of the handle, thereby avoiding any contact of a user's hand with the crank handle.

13. The hacksaw of claim 6, wherein the internal socket on the sleeve and the cooperating head on the adjusting screw are of hexagonal form.

14. The hacksaw of claim 6, wherein the socket extending through the lower portion of the handle includes a front portion and a rear portion, said front portion having a substantially square cross-section to allow an axial movement of the rearward end of the blade holder herein, said rear portion having a substantially cylindrical shape to allow reciprocal and rotational movement of the adjusting screw therein.

15. The hacksaw of claim 14, wherein a cross dimension of the rear portion of the socket in the handle is larger than an outside cross dimension of the sleeve, such as to allow reciprocal movement of the sleeve within the rear portion.

16. The hacksaw of claim 14, further including a cross wall separating the front and the rear portions of the socket, the cross wall having a central through hole for the forward portion of the adjusting screw passing therethrough.

17. The hacksaw of claim 16, wherein said adjusting screw further includes a rearward portion, wherein the forward portion of said adjusting screw is threaded a certain length thereof thereby constituting the forward end of the adjusting screw, and wherein the rearward portion is substantially a cylinder having a diameter larger than a diameter of the forward portion, such that, when the rearward portion thereof engages the cross wall, it is prevented from moving towards the blade holder.

18. The hacksaw of claim 17, further including a washer positioned between the cross wall in the socket and the rearward portion of the adjusting screw.

19. The hacksaw of claim 2, further including a sheath removably secured to the handle, the sheath having a U-shaped cross-section.

20. The hacksaw of claim 2, wherein the forward end of the blade holder includes a support structure to hold the blade in either one of two planes with a predetermined angle therebetween.

21. The hacksaw of claim 20, wherein the support structure has a first surface equipped with a first holding pin and a second surface equipped with a second holding pin, the angle between the first and the second surfaces being equal to 45°.

22. The hacksaw of claim 21, wherein the blade is removably secured to either one of said first and second holding pins.

23. The hacksaw of claim 20, which further includes a blade supporting member extending from the frame opposite to the handle and the support structure of the blade holder define the longitudinal plane of the hacksaw, and support the blade in said longitudinal plane or at the angle 45° to said longitudinal plane.

24. The hacksaw of claim 2, wherein the rearward end of the blade holder has a substantially square cross-section and includes a longitudinal threaded orifice therein for the engagement with the forward end of the adjusting screw.

25. A hacksaw having a blade, comprising:
a handle having a lower portion and an upper portion,
a blade tensioning means removably attached to the lower portion of the handle and connected to the blade at one end thereof, and
a tension indicator window at the lower portion of the handle having at least one tension indicia adjacent thereto;
wherein the blade tensioning means includes:
a blade holder connected by its forward end to the blade, an adjusting screw threadingly engaging a rearward end of the blade holder, and a crank handle having open and folded positions, and having means for disengaging the crank handle from the adjusting screw;
wherein, for adjusting the blade tension, the crank handle, in its open position, is rotated in one direction, thereby increasing the blade tension, while the rotation of the crank handle in the opposite to said one direction causes reduction of the blade tension;
wherein said rearward end of the blade holder is observed through the tension indicator window for being aligned with said at least one tension indicia predetermined for a required type of blade; and wherein, when the blade tension adjustment has been accomplished, the crank handle is mechanically disconnected from the adjusting screw.

26. The hacksaw of claim 25, wherein a detent means is provided within the lower portion of the handle.

27. The hacksaw of claim 26, wherein, once the blade tension adjustment has been accomplished, the crank handle, in its closed position, is held within the lower portion of the handle by the detent means.

28. In a blade tensioning mechanism for a hacksaw, wherein the hacksaw has a handle, and wherein the hacksaw is arranged along a longitudinal plane, the blade tensioning mechanism comprising the combination of a rotatable crank having a drive connection attached to the blade tensioning mechanism for increasing or decreasing the blade tension, respectively, means for disconnecting the drive connection between the crank and the blade tensioning mechanism, such that the crank is free-wheeling, and such that the crank may thereafter be aligned substantially with the longitudinal plane of the hacksaw without changing the blade tension, and said crank being able to be stored within said handle subsequent to the alignment thereof.

29. The blade tensioning mechanism for a hacksaw of claim 28, in combination with a handle, wherein the handle has a lower portion provided with a recess and further provided with a detent means, and wherein the crank is stored in the lower portion of the handle and is releasably retained therein by the detent means.

30. The blade tensioning mechanism for a hacksaw of claim 28 in combination with a handle and indicia, wherein handle has a lower portion including a side wall provided with a window for exposing a portion of the blade tensioning mechanism and wherein said indicia are provided on the side wall for cooperation with at least a portion of the blade tensioning mechanism to assure proper blade tension.

31. The method of tensioning a hacksaw blade, comprising the steps of providing a hacksaw including a portion having a window formed therein and further having graduations adjacent to the window, providing a tensioning means for the blade including a member having a portion visible through the window, moving the tensioning means so that the slack in the blade is taken up, and such that the portion of the member is aligned with one of the graduations, and further moving the tensioning means so that the portion of the member is moved by a predetermined number of graduations, thereby providing the proper blade tensioning and wherein the hacksaw is arranged along a longitudinal plane, wherein said window is provided in a handle of the hacksaw, and a rotatable crank is provided having a drive connection attached to the tensioning means for increasing or decreasing the blade tension, respectively, and wherein means for disconnecting the drive connection between the crank and the tensioning means is provided, such that to allow free movement of the crank, the method further comprising the steps of eliminating the free movement of the crank prior to tensioning the blade and disconnecting the crank from the tensioning means once proper blade tensioning has been reached, aligning the crank with said longitudinal place of the hacksaw without changing the blade tension and storing the crank within the handle subsequent to the alignment thereof.

32. The method of claim 31, wherein said handle has a lower portion provided with a recess and a detent means, said method of tensioning further comprising the steps of storing said crank in the lower portion of said handle and is releasably retained therein by the detent means.

* * * * *